(12) United States Patent
Kim et al.

(10) Patent No.: US 7,542,125 B2
(45) Date of Patent: Jun. 2, 2009

(54) METHOD FOR CUTTING AN LCD SUBSTRATE USING COOLANT HAVING LOW SURFACE TENSION AND LOW VISCOSITY PROPERTIES IN WHICH A PARTIAL CUT, COOLING WITH COOLANT AND THEN A FULL CUT TAKES PLACE AFTER COOLANT IS REMOVED

(75) Inventors: Gi-Heon Kim, Daegugwangyeok-si (KR); Dae-Ho Choo, Suwon-si (KR); Baek-Kyun Jeon, Yongin-si (KR); Hyung-Woo Nam, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 333 days.

(21) Appl. No.: 11/281,324

(22) Filed: Nov. 16, 2005

(65) Prior Publication Data

US 2006/0065647 A1    Mar. 30, 2006

Related U.S. Application Data

(62) Division of application No. 10/154,346, filed on May 23, 2002, now abandoned.

(30) Foreign Application Priority Data

May 23, 2001    (KR) .............................. 2001-28355

(51) Int. Cl.
*G02F 1/13*    (2006.01)
*B23K 26/14*    (2006.01)

(52) U.S. Cl. .................. 349/187; 65/112; 219/121.67; 219/121.72

(58) Field of Classification Search ............ 219/121.67, 219/121.72; 349/187; 65/112
See application file for complete search history.

(56) References Cited

U.S. PATENT DOCUMENTS

| | | | | |
|---|---|---|---|---|
| 3,453,097 A * | 7/1969 | Hafner | .................... | 65/112 |
| 5,622,540 A * | 4/1997 | Stevens | .................... | 65/112 |
| 6,489,588 B1 * | 12/2002 | Hoekstra et al. | ....... | 219/121.67 |
| 6,822,725 B2 * | 11/2004 | Choo et al. | .................. | 349/187 |

* cited by examiner

*Primary Examiner*—David Nelms
*Assistant Examiner*—John Heyman
(74) *Attorney, Agent, or Firm*—Cantor Colburn LLP

(57) ABSTRACT

Disclosed is a method of cutting a liquid crystal display (LCD) unit cell from an LCD assembly panel. The method includes applying a coolant onto heated cutting path formed on the LCD assembly panel. A rapidly heated portion of the substrate is rapidly cooled using water having a high specific heat or a mixed coolant in which a material for improving characteristics of surface tension, viscosity and thermal conductivity is dissolved in water. Therefore, the cutting quality of the substrate is improved, and a cutting speed is also enhanced.

5 Claims, 6 Drawing Sheets

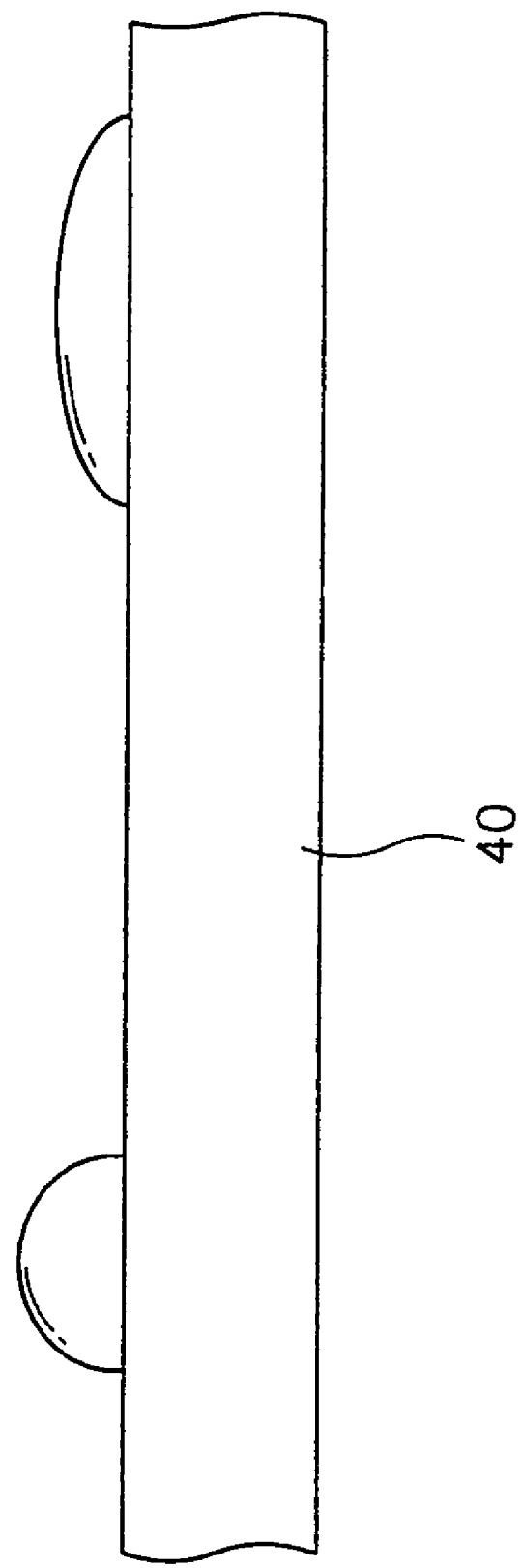

METHOD FOR CUTTING AN LCD SUBSTRATE USING COOLANT HAVING LOW SURFACE TENSION AND LOW VISCOSITY PROPERTIES IN WHICH A PARTIAL CUT, COOLING WITH COOLANT AND THEN A FULL CUT TAKES PLACE AFTER COOLANT IS REMOVED

CROSS REFERENCE TO RELATED APPLICATIONS

This application is a divisional application of U.S. patent application Ser. No. 10/154,346, filed on May 23, 2002, now abandoned, the disclosure of which is herein incorporated by reference in its entirety.

BACKGROUND OF THE INVENTION

1. Field of the Invention

The present invention relates to a method and apparatus for cutting a substrate using a coolant, more particularly, to a method and apparatus for cutting a selected portion of a substrate using a coolant having a high heat capacity to rapidly cool a heated portion of the substrate.

2. Description of the Related Art

Generally, a glass substrate is widely used in industrial, commercial and residential fields. The glass substrate is mainly made of silicon and has a non-crystalline structure.

In case that a minute groove is unexpectedly formed at a portion of the glass substrate, the non-crystal structure of the glass substrate causes a fine crack which is generated by impact or force applied to the minute groove. The crack is subsequently extended in an unexpected direction. Finally, this results in separation of an undesired portion.

This problem frequently occurs when using a method of cutting a glass substrate using a diamond cutter, in which a minute groove is formed on a surface of the glass substrate and then excessive stress is applied to the groove to separate the glass substrate. Although this cutting method might be suitable for commercial and residential fields, it is not suitable for the industrial field requiring high precision.

Particularly, the conventional cutting method is not suitable for cutting a glass substrate to be used for a liquid crystal display (LCD) device. To fabricate an LCD, it is necessary to integrate a plurality of semiconductor devices on a glass substrate having a desired surface area to form an LCD panel.

Recently, in order to maximize productivity of LCD panels, there has been proposed a technique in which 6 to 8 sheets of LCD panels are formed on a large-scaled mother glass substrate at the same time and then cut and separated individually from the mother glass substrate using the diamond cutting method. In this process, cutting an LCD panel from the large-scaled glass is very important, since the process belongs to a last step of the processes of fabricating the LCD panel.

When an LCD panel is separated from the large-scaled mother glass substrate using the diamond cutting method, as described above, a rough groove is formed on a cut surface due to the cutting characteristics of this method. In case that the LCD panel is separated from the large-scaled mother glass substrate along the rough groove, there is a critical problem that, since the cut surface is roughly formed, an undesired additional crack is generated and the crack is then spread, so that an image displaying portion is cut.

To solve the above problem, recently, there has been proposed a cutting method using thermal stress, in which a glass substrate is rapidly heated and cooled to cut a selected portion of the glass substrate.

In the cutting method using the thermal stress, which is different from the diamond cutting method, the portion to be cut is rapidly heated using laser beam having a desired wavelength. Then, the rapidly heated portion is rapidly cooled using a coolant having a temperature sufficiently different from that of the heated large-scaled glass substrate to form a scribe line that is partially cut. At this time, the scribe line functions to guide the portion to be cut so that a cutting region is precisely separated. Then, the laser beam heats again the scribe line so that the mother glass substrate is fully divided into multiple pieces due to thermal expansion.

In the above cutting method, an edge of the cut surface of the LCD panel is smoothly formed when the large-scaled mother glass substrate is divided into the multiple pieces. Therefore, it is prevented that the undesired crack is generated so that an undesired portion is separated due to the spreading of the crack. When a glass substrate is cut using the laser beam and the cooling fluid, the cutting performance may be improved or degenerated according to an energy level of the laser beam or a characteristic of the coolant.

Gas such as nitrogen and argon, etc., in a state of an ultra-low temperature is mainly used as a conventional coolant. However, when the gas is used as the coolant, the following problems occur:

Firstly, since the ultra-low temperature gas has a very small heat capacity, a temperature of the gas is changed when the gas is discharged. As a result, the gas having a higher temperature than a desired temperature is provided to the glass substrate. Therefore, it is difficult to efficiently cut the rapidly heated glass substrate, thereby degenerating the cutting speed and cutting characteristics.

Secondly, since the gas has the small heat capacity, it is difficult to lower a temperature of the glass substrate within a short time. Therefore, there is a problem of degenerating the cutting speed and the cutting characteristics.

Thirdly, the rapidly heated glass substrate and the discharged gas make movements relative to each other on the same plane. If the relative motion between the glass substrate and the gas is increased, it is difficult that the discharged gas precisely reaches a designated portion of the glass substrate, thereby decreasing the cutting speed.

Fourthly, when the low temperature gas is discharged, a surface area of the substrate to which the discharged gas reached is considerably larger than the area that the gas initially takes at the time of the discharge. As a result, the gas is partially lost in the air, so that a temperature difference between the heated glass substrate and the gas is reduced, thereby degenerating the cutting speed and the cutting characteristics.

SUMMARY OF THE INVENTION

The invention provides an apparatus for cutting a substrate, capable of rapidly cooling the substrate rapidly heated by a desired energy source, thereby optimizing a cutting speed and also maximizing a cutting characteristic.

The invention further provides a coolant used in the cutting apparatus.

The invention also provides a method of cutting the glass substrate using a thermal stress, in which the rapidly heated glass substrate is rapidly cooled using a desired energy source, thereby optimizing a cutting speed and also maximizing a cutting characteristic.

Accordingly, there is provided an apparatus for cutting a substrate. In the apparatus, a laser beam generating member is disposed at a base body and generates a laser beam having a desired wavelength to rapidly heat the substrate. A coolant supplying member is disposed at the base body and supplies a liquid coolant to the rapidly heated substrate. At this time, the supplied coolant stays on the substrate for a desired time.

In the present invention, the coolant used in the substrate cutting apparatus has the specific heat of about 3.7[KJ/KgK] or more. The liquid coolant used in the substrate cutting apparatus has the surface tension of about 73[dyn/cm] or less. The liquid coolant used in the substrate cutting apparatus has the viscosity of about 15[cP] or less. The liquid coolant used in the substrate cutting apparatus has the thermal conductivity of about 0.37[W/mK] or more. The liquid coolant used in the substrate cutting apparatus has the specific heat of 3.7[KJ/KgK] or more, the thermal conductivity of 0.4 [W/mK] or more, the surface tension of 73[dyn/cm] or less, and the viscosity of 15[cP] or less.

In the present invention, there is also provided a method for cutting a substrate using a coolant. In the above method, a cutting path formed on an assembly panel is rapidly heated. The assembly panel includes at least one or more LCD unit cells. A coolant having the specific heat of 3.7[KJ/KgK] or more, the thermal conductivity of 0.4[W/mK] or more, the surface tension of 73[dyn/cm] or less, and the viscosity of 15[cP] or less, is supplied onto the rapidly heated cutting path such that the assembly panel is partially cut to a predetermined depth along the cutting path.

According to the present invention, when cutting a substrate using the substrate cutting apparatus, water having the large specific heat, thermal conductivity, viscosity and surface tension, or a mixed coolant in which water is mixed with other material, is used, thereby minimizing the loss of the coolant when cutting a non-metal substrate, particularly, a glass substrate, and minimizing the change in the cooling portion and the change in the temperature, and thus, maximizing the cutting speed and cutting characteristic according to the rapid annealing (i.e., heating and cooling) of the glass substrate.

BRIEF DESCRIPTION OF THE DRAWINGS

The above objects and other advantages of the present invention will become more apparent by describing in detail preferred embodiments thereof with reference to the attached drawings in which:

FIG. 6 is a view showing different types of coolants applied onto a glass substrate according to the present invention.

DETAILED DESCRIPTION OF THE PREFERRED EMBODIMENTS

Now, preferred embodiments of the present invention will be described in detail with reference to the annexed drawings.

According to the present invention, one or more TFT substrate-forming regions may be formed on a large-scaled mother glass substrate and one or more color substrate-forming regions may be formed on another large-scaled mother glass substrate. The two large-scaled mother glasses are assembled to form an assembly panel. As a result, the assembly panel contains one or more LCD unit cells, and each LCD unit cell is precisely separated from the assembly panel.

Figure 1:
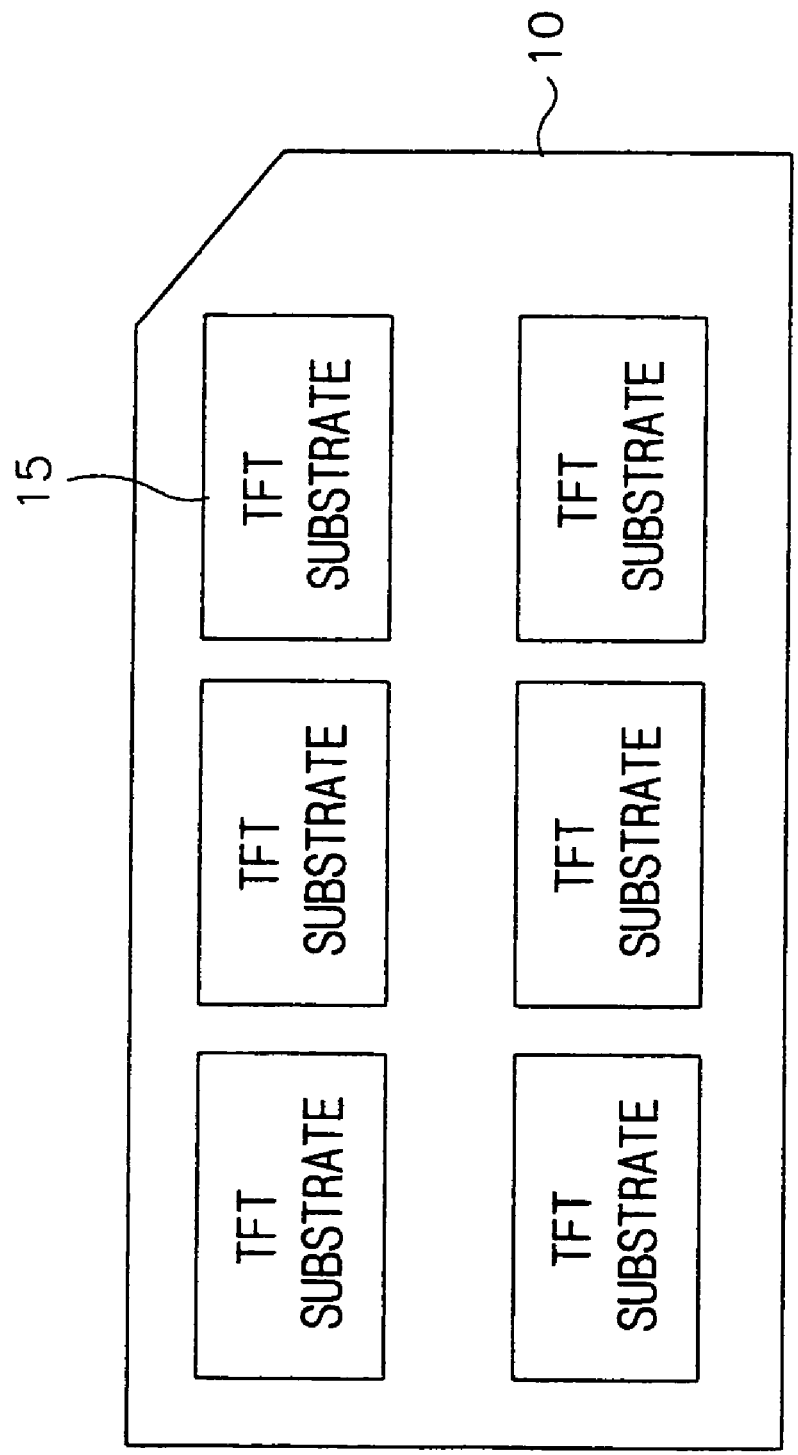
FIG. 1 is a schematic diagram illustrating a large-scaled mother glass substrate having TFT substrates to be cut by a substrate cutting apparatus according to one embodiment of the present invention.
Figure 2:
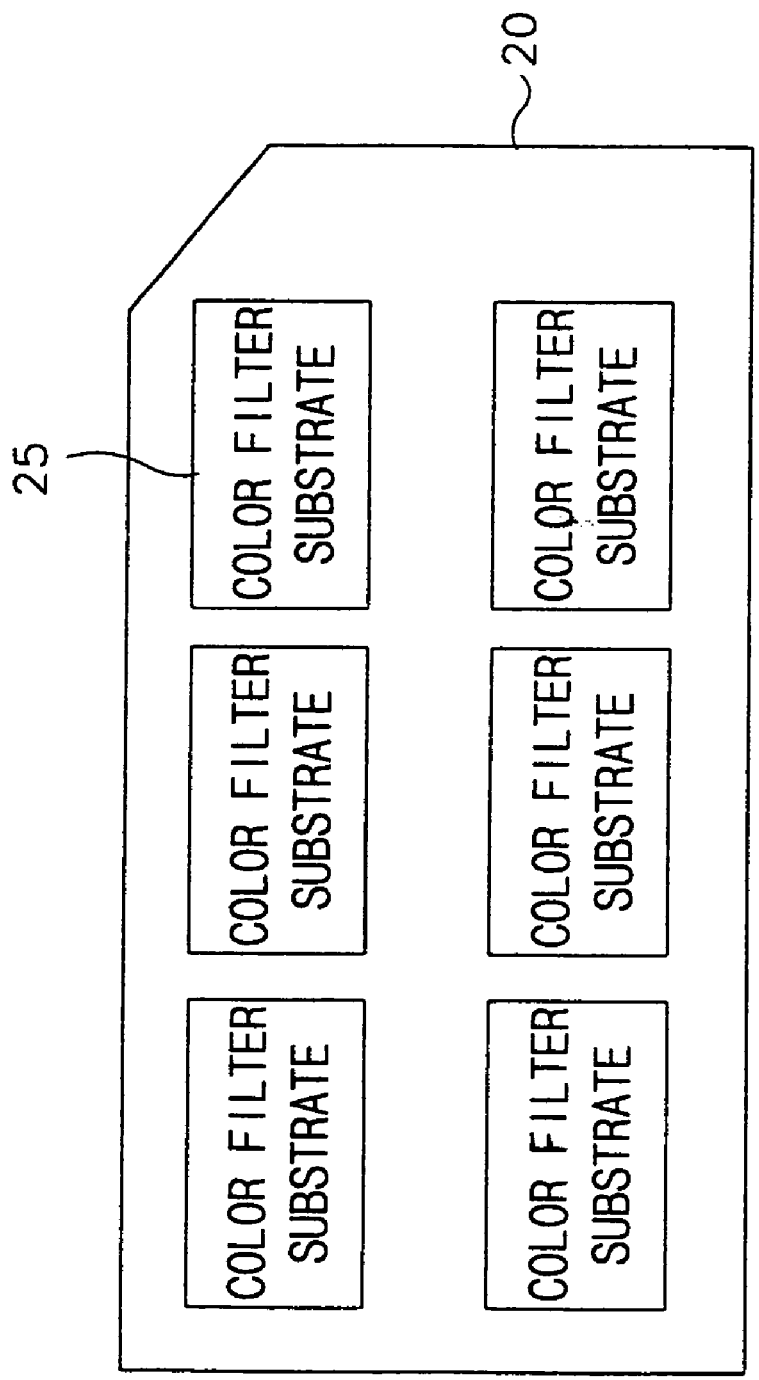
FIG. 2 is a schematic diagram illustrating a large-scaled mother glass substrate having color filter substrates to be cut by the substrate cutting apparatus according to one embodiment of the present invention.

More particularly, FIG. 1 shows a large-scaled mother glass substrate 10 having a desired thickness, on which, for example, six TFT substrate-forming regions 15 are formed. FIG. 2 shows a large-scaled mother glass substrate 20 having a desired thickness, on which, for example, six color filter substrate-forming regions 25 are formed. The two sheets of large-scaled mother glass substrates 10,20, on which the TFT substrate forming regions 15 and the color filter substrate-forming regions 25 are respectively formed, are assembled to align the TFT substrate forming regions 15 with the respective color filter substrate-forming regions 25. After that, liquid crystal (not shown) is injected between the TFT substrate-forming regions 15 and the color substrate-forming regions 25, and then the assembly panel is sealed.

Figure 3:
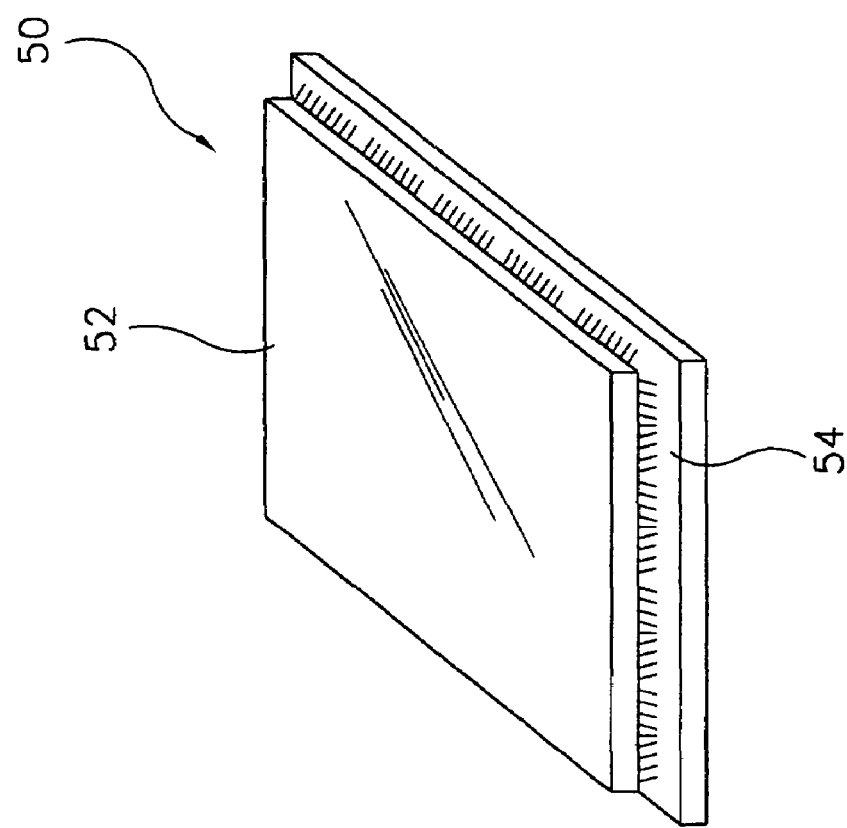
FIG. 3 is a perspective view showing a process of cutting an LCD unit cell from an assembly panel on which TFT substrate forming regions and color filter substrate forming regions are formed.

FIG. 3 shows the assembly panel 30 having the assembled two sheets of large-scaled mother glass substrates 10, 20. Particularly, in the assembly panel 30, a TFT substrate forming region and a color filter substrate forming region, which are opposite to each other in a state that the liquid crystal is injected therebetween, are defined as an LCD unit cell 40.

Figure 4:
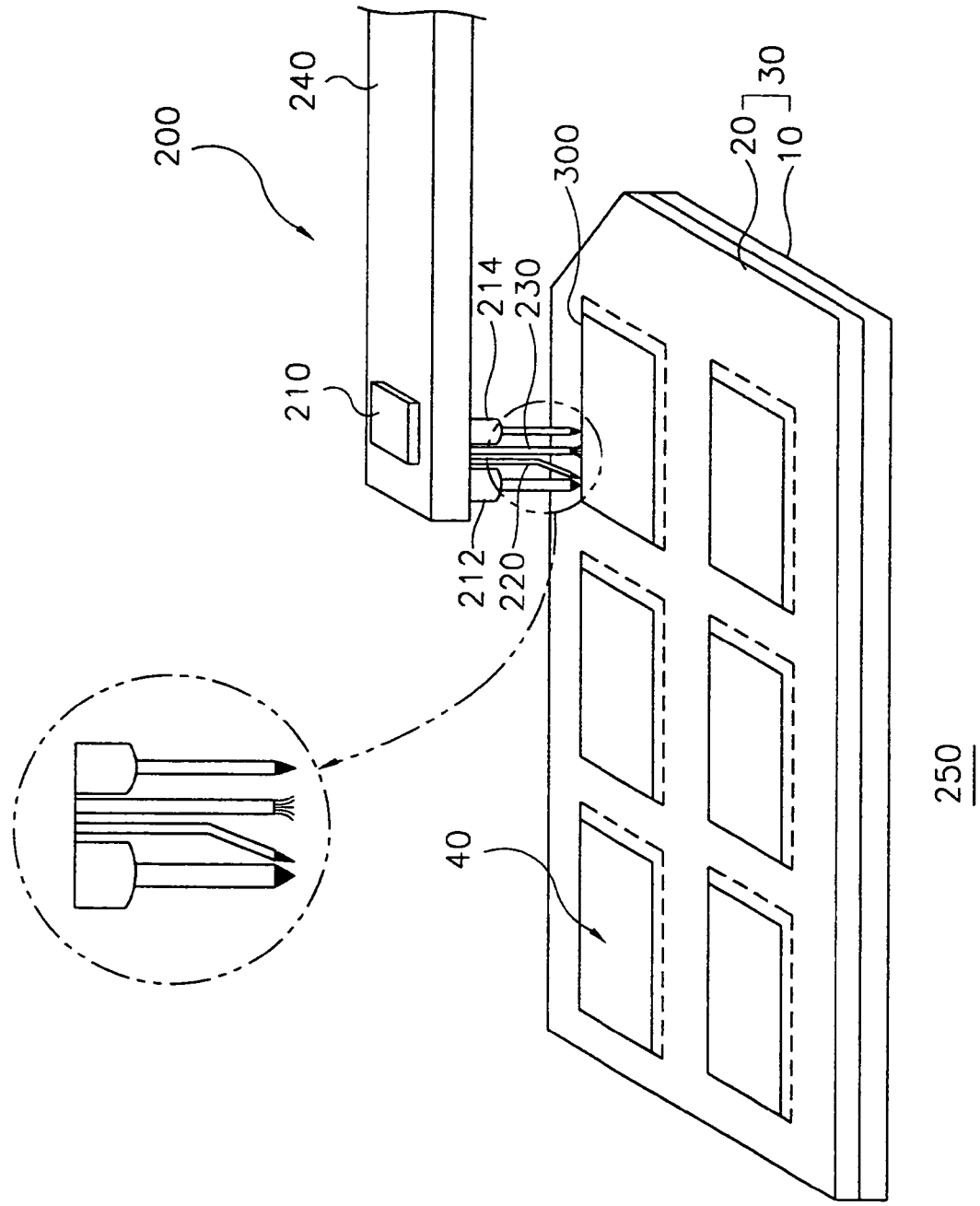
FIG. 4 is a perspective view showing an LCD panel cut and separated from the assembly panel in FIG. 3.

The LCD unit cell 40 is cut and separated from the assembly panel 30 to form an LCD panel 50 as shown in FIG. 4. Reference numeral 52 in the LCD panel 50 designates a color filter substrate separated from the color filter substrate-forming region 25 on the large-scaled mother glass substrate 20. Reference numeral 54 is a TFT substrate separated from the TFT substrate-forming region 15 on the large-scaled mother glass substrate 10. A printed circuit board (not shown) including an FPC (flexible printed circuit) (not shown) may be assembled in the LCD panel 50 to form an LCD panel assembly.

According to one embodiment of the present invention, when each LCD unit cell 40 is precisely cut and separated from the assembly panel 30 to form the LCD panel 50, a substrate cutting apparatus 200 is used to prevent a crack from being generated at an edge of the LCD unit cell 40 and spreading in an undesired direction.

Referring FIG. 3, the substrate cutting apparatus 200 comprises a laser beam generating device 210 for generating laser beam, a coolant-supplying device 220, a coolant sucking device 230, a supporting body 240 for supporting and mounting the above devices, a supporting table 250 on which the assembly panel 30 is mounted, and a transferring device (not shown) for relatively moving the supporting body 240 or the supporting table 250 at a desired speed.

Figure 5:
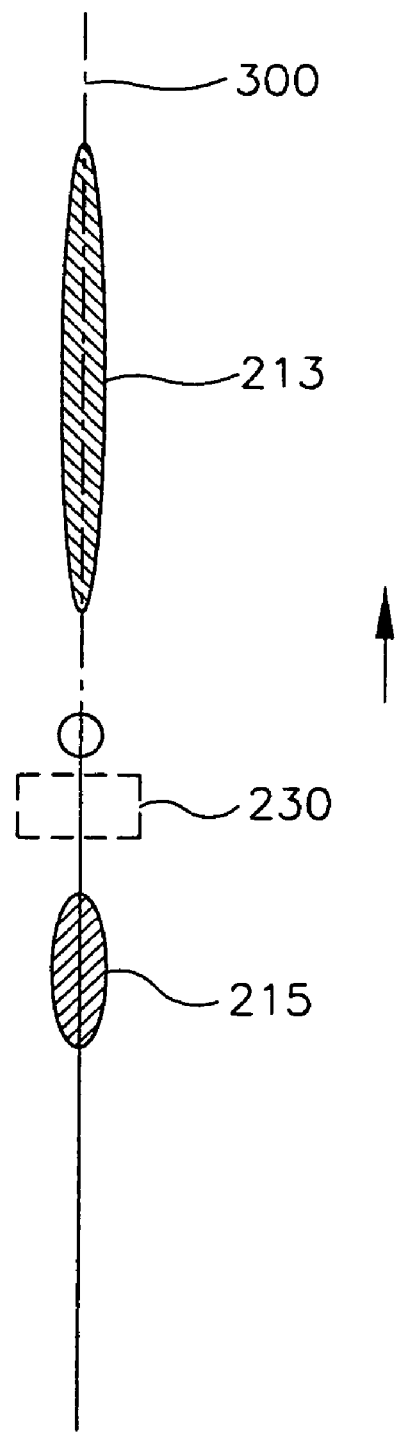
FIG. 5 is a view showing positions of the coolant and laser beams applied onto a substrate according to one embodiment of the present invention.

The laser beam generating device 210 includes a scribe laser beam generating unit 212 and a cutting laser beam-generating unit 214. As shown in FIG. 3 and FIG. 5, the scribe laser beam generating unit 212 generates a scribe laser beam 213 in the form of an elongate ellipse, of which the major axis is much longer than the minor axis, on a virtual scribe line 300 formed around the LCD unit cell 40. The cutting laser beam generating unit 214 generates a cutting laser beam 215 having a circular shape on the virtual scribe line 300.

The coolant-supplying device 220 is disposed at the supporting body 240 between the scribe laser beam generating unit 212 and the cutting laser beam generating unit 214. The coolant-supplying device 220 supplies coolant for cooling the virtual scribe line 300 that is rapidly heated by the scribe laser beam generating unit 212.

The coolant supplied from the coolant-supplying device to the virtual scribe line 300 performs an important part in a process of separating the LCD unit cell 40 from the assembly panel 30. The substrate cutting apparatus 200 according to one embodiment of the present invention advantageously prevents loss of the coolant, rapid changes in a coolant temperature and changes in an injecting area of the coolant after the coolant is injected from the coolant supplying device 220, thereby improving the cutting characteristics and speed. For example, water of 0° C.~10° C. instead of a coolant in a gas state is used as the coolant. Water has an optimum physical characteristics for the coolant. Since water has the largest heat capacity in comparison with various other materials having the same weight and is in a liquid state, water has an advantage that a loss in the amount of flowing water hardly occurs on the way to the glass substrate.

As described above, in case that water is used as the coolant, water can rapidly cool the assembly panel 30 within a short time period, in comparison with conventional ultralow temperature gaseous coolants used for cooling a heated glass substrate. Therefore, in comparison with the conventional ultralow temperature gaseous coolants used for cutting a glass substrate, water improves the cutting speed of the glass substrate and also increases thermal impact applied to the assembly panel 30, thereby improving the cutting characteristics.

In case that the cutting speed for separating the LCD unit cell 40 from the assembly panel 30 is increased, the time period for cutting and separating the LCD unit cell 40 from the assembly panel 30 is remarkably reduced, thereby improving productivity.

TABLE 1

|  | Water | Freon gas |
|---|---|---|
| Specific heat [KJ/KgK] | 4.18 | 1.58 |
| Cutting speed | Reference speed | Not separated |

Table 1 shows results of a simulation where the LCD unit cell 40 is cut from the assembly panel 30 which is rapidly heated by laser beam, using water or freon gas as the coolant.

In case that the rapidly and locally heated assembly panel 30 is locally cooled using water as the coolant, the water stays on the glass substrate for a desired time period, so that the LCD unit cell 40 is separated from the assembly panel 30 at a reference speed. Herein, the reference speed is defined as a cutting speed when cutting the assembly panel 30 using the water.

Further, according to Table 1, in case the rapidly and locally heated assembly panel 30 is cooled using freon gas having a lower temperature than water, the LCD unit cell 40 is not separated from the assembly panel 30.

As described above, using a liquid solution having a high specific heat, as the coolant, is more advantageous than using a gas having a low specific heat in the aspects of the cutting speed and the cutting characteristic. In other words, when cutting the assembly panel 30 using the thermal stress, the cutting speed is not dependent on a temperature difference $\Delta T$ between the locally heated assembly panel 30 and the coolant, but dependent on an inherent heat capacity $\Delta Q$ of the coolant.

The heat capacity of a coolant is defined as a function of a mass and a specific heat of the coolant.

$$\Delta Q = \text{specific heat}(S) \times \text{mass}(M) \quad \text{[Equation 1]}$$

Referring to Equation 1, the heat capacity is proportional to the mass (M) and the specific heat (S). For example, assuming that water and freon gas described in Table 1 have the same mass, the heat capacity of water is much larger than that of freon gas. The difference between the heat capacities of water and freon gas causes large difference in the aspect of the cutting speed. This means that the higher the heat capacity of the used coolant is, the faster the LCD unit cell 40 is separated from the assembly panel 30.

In another embodiment of the present invention, material having a high heat capacity is mixed with other material to obtain a mixed coolant which has cooling performance and cutting speed equal or superior to those of water. Preferably, the mixed coolant is obtained by dissolving the other material in water.

Hereinafter, several embodiments in the present invention will be explained. In a first embodiment, the mixed coolant has a lower surface tension than water. For the mixed coolant to have the lower surface tension, a surfactant is mixed with water at a desired ratio.

TABLE 2

|  | Mixed coolant | Water |
|---|---|---|
| Specific heat | 4.1[KJ/KgK] | 4.18[KJ/KgK] |
| Surface tension | ≈28[dyn/cm] | 73[dyn/cm] |
| Cutting speed | Equal to the speed when using water | Reference speed |

In case the surfactant is added to water, as shown in Table 2, the specific heat is coolant is lowered to 28[dyn/cm] (0° C.~10° C.), that is lower than the surface tension of water (73 [dyn/cm]), due to action of the surfactant.

As described above, if the specific heat of the mixed coolant is somewhat lowered comparing with that of water, the heat capacity of the mixed coolant is lowered than that of water having the same mass. However, according to the simulation result, the cutting speed is equal or superior to that when water is used as the coolant. This result is obtained by the function of the surfactant contained in the mixed coolant.

Referring to FIG. 6, assuming that water and a mixed coolant each having a different surface tension are injected on an assembly panel 40 at the same time, a difference between sizes of adhering surface areas of the water and the mixed coolant is generated responding to a difference between the surface tensions of the water and the mixed coolant.

If the difference between the adhering surface areas is generated, the mixed coolant having a large adhering surface area has a larger heat-discharging surface area than the water having a small adhering surface area. This means that the larger the adhering surface area of the assembly panel 40 onto which the coolant adhered is, the more the surface area for absorbing heat is increased, thereby rapidly cooling the assembly panel heated at a high temperature.

Therefore, in case of the mixed coolant in which the surfactant is mixed with water, the specific heat of the mixed coolant is lower than that of water. However, the cooling effect is increased according to an increase in the adhering surface area, thereby providing the cutting characteristic and the cutting speed equal or superior to water.

In a preferable embodiment of the present invention, the mixed coolant has a surface tension of 73[dyn/cm] or less so as to provide a maximum cutting speed.

In a second embodiment, the heat capacity of the mixed coolant using the present invention is similar to water and thermal conductivity of the mixed coolant is maximized.

TABLE 3

|  | Water | Water:Acetone (2:8) | Water:Acetone (5:5) |
|---|---|---|---|
| Specific heat | 4.18 | 3.77 | 3.24 |
| Thermal conductivity | 0.56 | 0.47 | 0.37 |
| Cutting speed | Reference speed | Equal to reference speed | Decrease of 4% compared with Reference speed |

Table 3 shows the cutting speed, the specific heat, and the thermal conductivities of the mixed coolants and water. Preferably, the coolant to be used in the present invention has a high heat capacity. If the mixed coolant, in which other material is dissolved in water, is used, as shown in the table 3, the specific heat is lowered.

According to Table 3, if the specific heat of the mixed coolant is 3.77[KJ/KgK] or less, the cutting speed is reduced due to the lowered specific heat. If the specific heat is lowered to 3.24[KJ/KgK] or less, the cutting speed decreases by about 4% compared with the reference cutting speed when using water as the coolant.

The thermal conductivity of the mixed coolant also exerts an influence on the cutting speed. As shown in Table 3, it is desirable that the thermal conductivity of the mixed coolant is about 0.47[W/mK] or more. If the thermal conductivity is lowered, the cutting speed is further reduced.

According to another embodiment of the present invention, the mixed coolant, in which water and other material are mixed, has a minimum viscosity.

TABLE 4

|  | Water | Ethylene glycol:Water (2:8) | Ethylene glycol:Water (5:5) |
|---|---|---|---|
| Specific heat | 4.18 | 3.83 | 3.31 |
| Viscosity [cP] (Normal temperature) | 1.1 | 10 or more | 15 or more |
| Cutting speed | Reference speed | Decrease of 19% compared with Reference speed | Decrease of 19% compared with Reference speed |

Table 4 shows that the viscosities of water and the mixed coolants, which respectively have a different mixture ratio, exert an influence on the cutting speed. The mixing coolant is made by mixing water and ethylene glycol at the ratio of 2:8 or 5:5. The viscosity of the mixed coolant is ten or fifteen times as high as that of water. The cutting speed, when using the mixed coolant, is lowered by 19% compared with the cutting speed when using water as the coolant, regardless of the mixture ratio of water and the ethylene glycol. This is because the coolant sucking device 230 (referring to FIG. 3) can not completely suck the mixed coolant due to the high viscosity of the mixed coolant, thereby causing scattering of the laser beam generated from the cutting laser beam generating unit 214 (referring to FIG. 3), as described below. If an assembly panel is cut at a high speed without regard for the above problem, the cutting operation is not precisely performed. Accordingly, if the viscosity of the mixed coolant is excessively higher than that of water, the cutting speed of an assembly panel is lowered.

Hereinafter, factors in degrading or improving the characteristics of exemplary mixed coolants will be described.

TABLE 5

|  | A | B | C | D | E | F | G | L |
|---|---|---|---|---|---|---|---|---|
| Specific heat | 4.18 | 3.83 | 3.31 | 3.84 | 3.33 | 3.77 | 3.24 | 4.1 |
| Thermal conductivity | 0.56 | — | — | 0.49 | 0.38 | 0.47 | 0.37 | — |
| Surface tension | — | 61 | 50 | 50 | 40 | 52 | 44 | 28 |
| Viscosity [cP] (Normal temperature) | 1.1 | 10 or more | 15 or more | 0.9 | 0.8 | 0.7 | 0.6 | 1.1 |
| Cutting speed | Reference speed | Decrease of 19% compared with reference speed | Decrease of 19% compared with reference speed | Reference speed | Decrease of 14% compared with reference speed | Reference speed | Decrease of 4% compared with reference speed | Reference speed |

TABLE 6

|  | H | I | J | K |
|---|---|---|---|---|
| Specific heat | 1.58 | 0.52 | 1.62 | 1.55 |
| Thermal conductivity | — | — | — | — |
| Surface tension | 17 | 23.2 | 12 | 12 |
| Viscosity [cP] (Normal temperature) | 0.6 | 1.0 | 0.7 | — |
| Cutting speed | Not cut | Not cut | Decrease of 63% compared with reference speed | Not cut |

Table 6 shows the results of an experiment in which a large-scaled mother glass substrate is cut using a coolant having gaseous characteristics. In Table 6, the coolants in columns H, I, J are freon gas, and the coolant in column K is silicon oil. The freon gas and the silicon oil has the lower specific heat than that of water or the mixed coolant in which water and other material are mixed. Therefore, though they have the surface tension and the viscosity characteristics superior to water and the mixed coolant, an LCD unit cell is not separated from an assembly panel, or the cutting speed is remarkably lowered.

In contrast, Table 5 shows the results of an experiment in which water and the mixed coolant in which water and other material are mixed, are used as the coolant. The cutting performance is greatly improved compared with the coolant having the gaseous characteristics.

The coolant in column A in Table 5 is, for example, deionized water, column B is a mixed coolant in which ethylene glycol is dissolved in water at the weight ratio of 2:8, column C is a mixed coolant in which ethylene glycol is dissolved in water at the weight ratio of 5:5, column D is a mixed coolant in which methanol is dissolved in water at the weight ratio of 2:8, column E is a mixed coolant in which methanol is dissolved in water at the weight ratio of 5:5, column F is a mixed coolant in which acetone is dissolved in water at the weight ratio of 2:8, and column G is a mixed coolant in which acetone is dissolved in water at the weight ratio of 5:5, And column L is a mixed coolant in which surfactant is mixed with water at a desired weight ratio.

These mixed coolants have relatively superior performances compared with the coolant having the gaseous physical characteristics. However, the performance of each mixed coolant is different according to its composition. The mixed coolants of columns D, F and L in Table 5 have the most excellent cooling characteristics. The mixed coolant of column G has the next excellent cooling characteristics. The mixed coolants of columns B, C and E have the cooling characteristics after that of the coolant in column G.

For a mixed coolant to have the excellent cooling characteristics, as shown in columns D, F and L, the mixed coolant should have the characteristics such as a specific heat similar to water, a low surface tension, a high thermal conductivity and a low viscosity. As shown in Table 5, in case a mixed coolant satisfies one or more characteristics of the specific heat characteristic, the surface tension characteristic, the thermal conductivity characteristic and the viscosity characteristic, or satisfies all of the characteristics, an assembly panel can be rapidly cut compared with when using a gaseous coolant.

Preferably, the minimum specific heat of a mixed coolant used in the present invention is about 3.7[KJ/KgK] or more. If the specific heat is less than about 3.7[KJ/KgK], the cooling performance is remarkably reduced, as shown in table 6. The minimum thermal conductivity of a mixed coolant used in the present invention is about 0.4[W/mK] or more. If the thermal conductivity is less than about 0.4[W/mK], the cooling performance is also remarkably reduced. The maximum viscosity of a mixed coolant used in the present invention is about 1.1[cP] or less.

Referring again to FIGS. 3 and 5, a mixed coolant is supplied through the coolant-supplying device 220. The mixed coolant is injected on the assembly panel 30, particularly, on a portion of the assembly panel 30 which is locally heated by the scribe laser beam 213 generated from the scribe laser beam generating unit 212. The coolant-sucking device 230 for sucking the mixed coolant injected from the coolant-supplying device 220 is disposed at a rear portion of the coolant-supplying device 220 so as to suck the injected mixed coolant for cooling the assembly panel 30. The scribe laser beam-generating unit 212 and the coolant-supplying device 220 functions to form a scribe line as a crack having a desired depth on the surface of the assembly panel 30.

At a rear portion of the coolant-supplying device 220, the cutting laser beam generating unit 214 is disposed at the supporting body 240 to rapidly heat the scribe line and then fully cut the assembly panel 30 using a thermal expansion.

Hereinafter, a method of cutting the LCD unit cell 40 from the assembly panel 30 using the substrate cutting apparatus 200 will be fully described with reference to the annexed drawings. First, the assembly panel 30 is fixed to the supporting table 250. Then, the virtual scribe line 300 of the assembly panel 30 to be cut is precisely aligned with the supporting body 240. After that, the transferring device relatively moves the supporting table 250 and/or the supporting body 240 so that the scribe laser beam 213 generated from the scribe laser beam generating device 212 disposed at the supporting body 240 rapidly heats the virtual scribe line 300.

Then, water or the mixed coolant is injected to the portion of the assembly panel 30, which is rapidly heated by the scribe laser beam 213, so as to perform the cooling operation. At this time, the portion of the assembly panel 30, which is rapidly heated by the scribe laser beam 213, is locally expanded according to an annealing temperature. Then, the water or the mixed coolant rapidly cools the rapidly heated portion of the assembly panel 30. Accordingly, the volume of the expanded portion of the assembly panel 30 is rapidly reduced.

The expansion and reduction of the volume generates large thermal stress. Thus, the structure of glass molecules is broken due to the thermal stress. Finally, the crack having the desired depth is formed along the virtual scribe line 300 to form the scribe line. The scribe line functions to facilely and fully cut the assembly panel 30 and also prevents the crack from being spread to an undesired portion of the assembly panel 30. Then, the cutting laser beam 215 generated from the cutting laser beam generating device 214 rapidly heats the scribe line, on which the crack is formed, again.

Therefore, the thermal expansion is occurred at the scribe line, on which the crack is formed, again. One of the TFT substrate-forming region 15 and the color filter substrate-forming region 25 of the LCD unit cell 40 is separated along the scribe line from the assembly panel 30. Then, the assembly panel 30 is turned over. The other of the TFT substrate-forming region and the color filter substrate-forming region is cut, so that the LCD unit cell 40 is cut and separated from the assembly panel 30.

According to the present invention, when cutting the substrate using the substrate cutting apparatus, water having the large specific heat, thermal conductivity, viscosity and surface tension, or the mixed coolant, in which water is mixed with other material, are used, thereby minimizing the loss of the coolant when cutting a non-metal substrate, particularly, glass substrate, and minimizing the change in the cooling portion and the change in the temperature, and thus, maximizing the cutting speed and cutting characteristic according to the rapid annealing (i.e., rapid heating and cooling) of the glass substrate.

While the present invention has been described in detail, it should be understood that various changes, substitutions and alterations can be made hereto without departing from the spirit and scope of the invention as defined by the appended claims.

What is claimed is:

1. A method of cutting a liquid crystal display (LCD) unit cell from an LCD assembly panel, comprising:
heating a cutting path formed on the LCD assembly panel in which the LCD unit cell is surrounded by the cutting path;
applying a mixed coolant including an organic material mixed with water onto the heated cutting path so that the LCD assembly panel is partially cut to a predetermined depth along the cutting path;
sucking the coolant to remove the applied coolant from the cutting path of the LCD assembly panel; and
heating the cutting path from which the applied coolant is removed to fully cut the LCD assembly panel along the cutting path,
wherein a surface tension of the mixed coolant is equal to or lower than about 52 dyn/cm to increase an adhering area between the mixed coolant and the LCD assembly panel, while a specific heat of the mixed coolant is equal to or higher than about 3.7 KJ/KgK and thermal conductivity of the mixed coolant is equal to or higher than about 0.4.

2. The method of claim 1, wherein the mixed coolant includes a surfactant for reducing the surface tension of the coolant.

3. The method of claim 1, wherein the mixed coolant includes methanol dissolved in water at a ratio of 2:8.

4. The method of claim 1, wherein the mixed coolant includes acetone dissolved in water at a ratio of 2:8.

5. The method of claim 1, wherein a viscosity of the mixed coolant is equal to or lower than about 1.1 cap so that the mixed coolant is easily removed from the LCD assembly panel during said sucking the mixed coolant.

* * * * *